Figure 1:
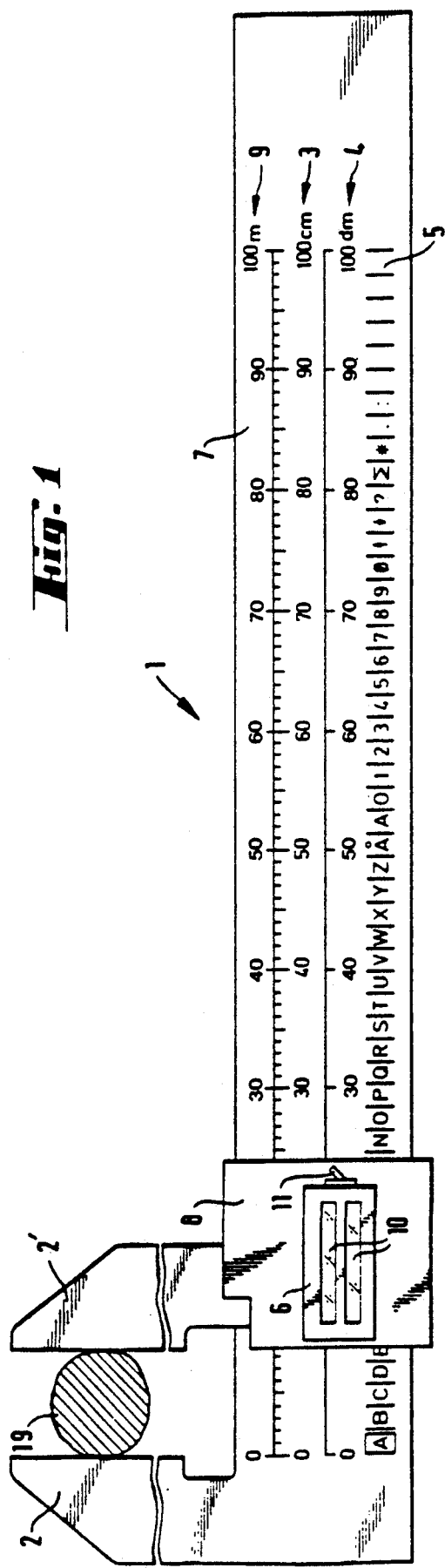

United States Patent [19]

Luikko

[11] Patent Number: 5,022,162

[45] Date of Patent: Jun. 11, 1991

[54] GENERAL PURPOSE MEASURING IMPLEMENT USABLE IN THE FIELD, AND ITS DATA TRANSFER METHOD

[75] Inventor: Henrik Luikko, Helsinki, Finland

[73] Assignee: Thomesto Oy, Helsinki, Finland

[21] Appl. No.: 382,697

[22] PCT Filed: Feb. 9, 1988

[86] PCT No.: PCT/FI88/00020

§ 371 Date: Aug. 9, 1989

§ 102(e) Date: Aug. 9, 1989

[87] PCT Pub. No.: WO88/06278

PCT Pub. Date: Aug. 25, 1988

[30] Foreign Application Priority Data

Feb. 10, 1987 [FI] Finland ............................ 870533

[51] Int. Cl.⁵ ................................................ G01B 3/20
[52] U.S. Cl. ............................................ 33/784; 33/810
[58] Field of Search ............... 33/784, 783, 791, 793, 33/794, 795, 796, 810; 364/560, 562, 563

[56] References Cited

U.S. PATENT DOCUMENTS

| | | | |
|---|---|---|---|
| 4,143,267 | 3/1979 | Johnson et al. | 33/784 |
| 4,216,584 | 8/1980 | Meissner et al. | 33/784 |
| 4,226,024 | 10/1980 | Westerberg et al. | |
| 4,229,883 | 10/1980 | Kobashi | 33/784 |
| 4,435,904 | 3/1984 | Logan et al. | 33/784 |
| 4,459,749 | 7/1984 | Rieder et al. | |
| 4,483,077 | 11/1984 | Matsumoto et al. | 33/784 |
| 4,566,199 | 1/1986 | Gruhler et al. | 33/784 |
| 4,612,656 | 9/1986 | Suzuki et al. | 33/784 |
| 4,736,313 | 4/1988 | Nishimura et al. | 364/563 |

FOREIGN PATENT DOCUMENTS

| | | | |
|---|---|---|---|
| 2550068 | 5/1976 | Fed. Rep. of Germany . | |
| 3432511 | 3/1985 | Fed. Rep. of Germany . | |
| 50573 | 12/1975 | Finland . | |
| 0154011 | 9/1982 | Japan | 33/784 |
| 0055220 | 3/1985 | Japan | 33/784 |
| 0213601 | 9/1986 | Japan | 33/784 |
| 0219819 | 9/1986 | Japan | 33/784 |

*Primary Examiner*—William A. Cuchlinski, Jr.
*Assistant Examiner*—C. W. Fulton
*Attorney, Agent, or Firm*—Marshall, O'Toole, Gerstein, Murray & Bicknell

[57] ABSTRACT

The invention relates to a general measuring implement (1) usable in the field or in otherwise difficult circumstances and in particular applicable to the measuring of raw timber and the recording of the measurement data, and to a method, usable with this implement. Each position of substantial length along the implement distinguishable from the others, or value (3,4) of the sensor has been coded to correspond to a certain element of an alphanumeric scale (5). Each measurement value and alphanumeric-scale data item or element is read into the memory unit (6) for recording with one contact function of one switching means (11).

14 Claims, 3 Drawing Sheets

| I | Data to be recorded | | |
|---|---|---|---|
| II | Sample area | Experimental plot | 1.x ... |
| | | | 2.x ... |
| | | tree 1  1. ..... | 3.1 |
| | | 2. ..... | 3.2 |
| | | 3. ..... | 3.3 |
| | | 4. ..... | 3.4 |
| | | 5. ..... | 3.5 |
| | | | etc. |
| III | | tree 2  1. ..... | |
| | | 2. ..... | |
| | | 3. ..... | |
| | | 4. ..... | |
| | | 5. ..... | |
| | | tree 3  1. ..... | |
| | | 2. ..... | |
| | | 3. ..... | |
| | | 4. ..... | |
| | | 5. ..... | |
| II | Sample area | Experimental plot | |
| | | tree 4  1. ..... | |
| | | 2. ..... | |
| | | 3. ..... | |
| | | 4. ..... | |
| | | 5. ..... | |
| III | | tree 5  1. ..... | |
| | | 2. ..... | |
| | | 3. ..... | |
| | | 4. ..... | |
| | | 5. ..... | |
| | | tree 6  1. ..... | |
| | | 2. ..... | |
| | | 3. ..... | |
| | | 4. ..... | |
| | | 5. ..... | |
| I | Data to be recorded | | |
| II | Sample area | Experimental plot | |
| | | tree 1  1. ..... | |
| | | 2. ..... | |
| | | 3. ..... | |
| | | 4. ..... | |
| | | 5. ..... | |
| III | | tree 2  1. ..... | |
| | | 2. ..... | |
| | | 3. ..... | |
| | | 4. ..... | |
| | | 5. ..... | |

Fig. 3

GENERAL PURPOSE MEASURING IMPLEMENT USABLE IN THE FIELD, AND ITS DATA TRANSFER METHOD

The invention relates to a general-purpose measuring implement usable in the field or in otherwise difficult circumstances, and especially to one applicable to measuring raw wood and to recording measurement data, and to a method, usable with this implement, for transferring to the electronic memory of the implement the data to be recorded.

If measuring raw wood is taken as an example, the question is of, for example, measuring logs in storage and measuring logs in piles, as well as, with respect to measuring standing timber, of counting the number of trees and making various sampling measurements.

In all these measurements, several preliminary data are required, such as personal data, data concerning the measuring area, etc. In addition, each measuring operation requires a series of various data which relate to one another in a certain manner. In measuring timber in storage, the items measured and recorded include the number of the chance, the type of timber, the length of the log, the diameter of the log, and possibly the quality class of the log. In measuring pulpwood in piles, the items measured and recorded include the height data of the pile (at predetermined intervals), the length of the items of timber, and the pile density factors. In measuring standing timber, the items measured and recorded regarding each tree include the diameter at chest height, the number of the chance, the type of the trunk, and the running number of the trunk. In sample measurement, the items measured and recorded regarding the trunks in the random sample include the diameter at breast height, the diameter at the height of 6 m, the length of the trunk, the type of the trunk, and quality data regarding the trunk. There are different principles and mathematical methods for defining the trunks included in the random sample.

These measuring methods as such have been used for a rather long time, and there are different variations in their details. Previously, the measurement values obtained and the other data have been recorded by writing them down on the spot in the field on paper, such as pre-made forms, from which they have later been picked out in the office and entered for further processing. The further entering and further processing of the data are often computerized.

Even at present, most of the recording of the data is by hand on paper. Recording electronic measuring implements have been made for certain individual measurements, but the problem of recording by means of one implement all the values relating to some measurement series, such as the measurement of logs in storage, has not been solved in a manner applicable in practice, not to speak of the problem of recording all different kinds of measurements by means of one implement, as is evident from the following.

One way to record figures is to use a separate electronic recording device, which can be an advanced pocket calculator with a large memory, or a pocket computer, or some other device which converts mechanical data into electronic data. In this case the measuring itself is carried out in a completely conventional manner by mechanical, hand-held measuring implements, whereafter the measured value is recorded by entering it into an electronic memory by means of the keyboard of the recording device or some other mechanism, as in Patent FI-50573. When all of the measurements to be carried out at one time have been carried out, the further processing of the measurement data can be effected in the case of more advanced devices by means of the recording device itself, or the measurement data can be transferred in electronic form along a cable to the actual processing computer.

The most advanced measuring method and implement is the implement presented in Patent FI-68316 for measuring and recording the diameter of timber. This implement is made up either of calipers or of a sliding caliper gage, by means of which in the first phase the diameter is measured in exactly the same way as when using a merely manually operated mechanical gage; in the second phase the electronics of the implement read and record in its electronic memory the diameter measured, this second phase taking place at the moment when the user presses the recording key of the implement. The measuring implement itself must be throughout the operation in the first-phase state, i.e. in the measuring position in relation, to the object, being measured. The implement recognizes the value to be recorded, for example, on the basis of the position of the measuring slide of the sliding caliper gage the value having been calibrated to correspond to the actual measure of this position of the measuring slide in millimeters or centimeters. In general, the measuring implement itself has only a sensor and operating means, in which case the actual recording unit is in, for example, a bag to be held hanging from the shoulder of the user. The information from the sensor to the recording unit travels along cables. Even in this, the transfer to the actual processing computer can be in electronic form. Systems corresponding to this, for various uses, have been disclosed in patents DE-3 432 511 and U.S. Pat. No. 4,459,749.

It is also possible that the above-mentioned measuring and recording devices are combined. In this case, for example, the value yielded by the sensor of the sliding caliper gage is recorded by pressing some key, and the other values are recorded by using, for entering a value otherwise measured the device keyboard, which corresponds to the keyboard of a calculator or a pocket computer, for entering a value otherwise measured. The recording unit with its keyboard can be located in connection with the sliding caliper gage, or it can be at the end of a cable from the sliding caliper gage, in a bag hanging from the shoulder of the user.

All these known or readily conceivable systems involve several very great disadvantages.

When the most traditional method is used, in which the data are recorded on paper, the problems include:

the recording itself is done in the field, possibly in rain, wind and cold (the paper gets wet, wind takes the paper, the pen will not write, the fingers freeze), the work is slow, since the papers have to be dug out and put away before and after each actual measuring, since the recording takes place after the actual measuring, slips of memory may occur, writing errors may be produced in the phase of filling in the form, and reading errors when the data are transferred in the office for further processing.

In all those systems described which involve a keyboard, i.e. in all those systems in which the aim is to record electronically more than one type of measurement result (such as the diameter), the problem lies specifically in the keyboard involved. Since the keyboard should be capable of operating flawlessly in all weather conditions, in practice protecting the contact part of the keyboard, and the electronics connected with it, effectively enough against water, freezing temperatures and shocks is very difficult. A disturbance in this respect will either destroy the results of work already done or will at least prevent further work. In addition, it is very difficult to place in the devices a sufficient number of keys without the work suffering from it, since the keys should be large enough to be handled without errors with gloves or mittens on. A separate recording device involves the further inconvenience that, if the measuring is carried out by one person, after each measurement the actual measuring device must be put down, the recording device must be taken out, the data item must be entered into the memory, the recording device must be put away, for example into a bag, and the actual measuring device must be taken out again in order to continue the measuring. Usually there are two persons carrying out the measuring of timber in storage, one measuring and the other recording.

In an implement using one measuring method, the implementation and recording of the measurement in question can take place without the above disadvantages, but the use of such an implement has the disadvantage that the other data necessary for the measurement series in question must be written down either using a pen and paper or using the above-mentioned separate recorder. This involves, in addition to the problems already mentioned, the problem of combining the different measurement data, which means that there are difficulties in combining in the calculation phase the data which are separate in the files but are interrelated. The reason for this is that these interrelated data take different information routes, on the one hand entry into the electronic memory of the measuring device and on the other hand recording on paper. In addition, there are, of course, the problems related to the use of paper and to the keyboard.

The method according to the invention and the implement corresponding to the method provide a crucial improvement with respect to the disadvantages mentioned above.

By using and applying the method according to the present invention, it is possible to construct a measuring and data collection implement having a simple construction and versatile functions. In the most advantageous case when the method of the invention is applied, only one recording key is needed; by using this key it is possible to record all the necessary data, to shift from one scale to another, to correct or change possibly erroneous data, to shift to the use of an alphanumeric mode of presentation, or to give program instructions to the microprocessor possibly in the implement. When the implement according to the invention is used for measuring timber, savings are also achieved in labor costs, since only one person is needed for carrying out the measuring and the recording. The implement corresponding to the method of the invention thus has the following advantages:

all data and all kinds of data can be recorded using one implement, and no auxiliary equipment or paper is needed, the implement can be easily constructed so as to withstand different weather conditions and to be reliable in operation, the use of the implement in the field is easy, since it can easily be made small and light, and it can be easily controlled with the gloves on by using, for example, one key, the user need not shift from one implement to another between the measuring and the recording of the result, and errors in data transfer (recording and reading errors) are minimized, since the recording is carried out mostly and the reading completely electronically.

The invention is described below in detail with reference to, for example, the accompanying drawings in order to illustrate the principle of the method.

Figure 2:
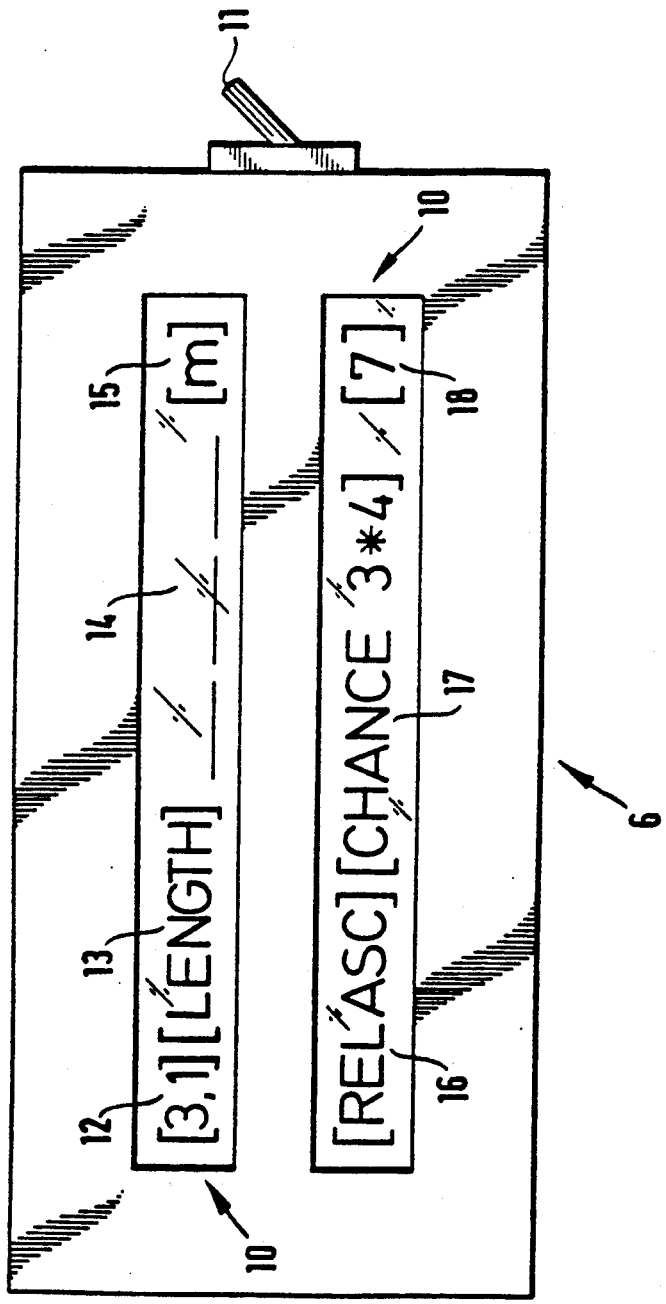

FIG. 1 is an overall representation of the application of the method according to the invention in conjunction with a sliding caliper gage, FIG. 2 depicts one preferred embodiment of the measuring and recording unit for applying the method according to the invention, FIG. 3 depicts in principle the hierarchy of the data to be measured and recorded.

FIG. 1 shows, in substantially its outer form, a conventional sliding caliper gage 1 used for measuring raw timber; its principal parts are a gage arm 7 and gage jaws 2, 2′, one of them being fixed to the arm 7 and the other to the slide 8 of the gage. In the gage arm 7 there is not only first a conventional graduated centimeter scale 3 for the diameter of the timber but, in addition, converted by a suitable scale, also a graduated meter scale 9 and a graduated decimeter scale 4 and, as a completely separate graduated scale, an alphanumeric graduated scale 5. Usually the actual measuring length of the measuring scale of the arm is about 52 cm, in which case, if one interval between the marks is taken to be one centimeter, there is room on the alpha-numeric scale for 52 codes or other characters such as the alphabet, punctuation marks, numerals, etc. In addition, in the slide 8 of the gage 1 there is an electronic measuring and recording unit 6, which is made up of a sensor means (not shown), an alphanumeric display 10 and, for example, a monostable switch 11.

FIG. 2 shows in greater detail one measuring, display and switching unit applicable to the implementation of the method according to the invention. This unit may be, for example, the recording unit 6 of the sliding caliper gage of FIG. 1, together with its display 10 and switch 11. The alphanumeric display shows the data necessary for the implementation of the measurement and its recording, in this case the ordinal code 12 of the measurement to be effected among the quantities belonging to the measurement series, the quantity 13 to be measured, the value 14 of the quantity measured, the measuring unit (quality) 15, the measuring method 16 used, the identification data 17 of the object of measurement, the number 18 of the comparable measurements (here tree trunks).

The sensor in the recording unit detects the distance of the gage jaw 2′ of the slide from the fixed gage jaw 2; otherwise the sensor itself may be of any type, known per se, suitable for the purpose, such as a potentiometer, on the shaft of which there is a cogged wheel, the mating part of which is a cogged rail attached to the arm 7 (in which case the resistance of the potentiometer changes as a function of its angle of roll, and thereby of the distance), or an inductive, optical, or other such structure.

The use of the implement applying the method according to the invention takes place in the actual measuring situation in the manner described below. When the object of measuring is, for example, measuring logs in storage, measuring the diameter of a log is effected in other respects as when using a normal sliding caliper gage 1 around the trunk 19 at its end (according to the measuring instructions), but the value obtained need not be transferred separately anywhere; it is recorded in the electronic memory of the recording unit 6 of the implement by pressing the switch 11 in connection with this gauging process. The user may, if he so desires, check in the display 10 of the recording unit the values of the quantity recorded and the reference data, but otherwise he need not take them into account. When this measurement value has been recorded, the microprocessor of the recording unit sets the measuring unit ready to receive the next measurement according to the defined measuring method; in the case of measuring logs in storage, it is the length of the log. The result of this measurement of length is now recorded in accordance with the invention in the same manner as was the diameter, i.e by using the sliding caliper gage and pressing once the key 11, except that the measuring scale used is the graduated decimeter scale 9 marked on the gage arm 7; with the exception of the unit, this graduated scale may be identical to the graduated centimeter scale 3, or it may be converted by some other scale. What is essential is that this scale and the measuring quantity and other such facts have been programmed into the microprocessor; the user can check these, the same way as above, in the display 10 of the recording unit. Thereafter the microprocessor again sets the measuring unit ready to receive the next measurement in accordance with the defined measuring method; in the case of measuring logs in storage, this is the quality class of the log (not yet a routine measurement). The user assesses this and records it with the recording unit by shifting the slide on the alphanumeric scale to the class code of the quality class in question and by pressing the switch 11. At this time the microprocessor recognizes that the value in question means the quality class in question, and the user can again check the result in the display 10. When one log to be measured has been gone through in the above manner with respect to all the quantities to be measured, the microprocessor sets the measuring unit ready for the measuring next log, which is effected in the same manner as the measuring of the first log. When all of the logs of a batch have been measured, the measuring is terminated by taking the slide to, for example, a point coded for the fact in question outside the actual measuring scale on the alphanumeric scale and by pressing the switch 11; thus the microprocessor receives a signal of the termination of this part of the measuring. The termination signal can be effected in many other ways as well, for example with two pressings of the switch 11, the time interval between the pressings being within predetermined limits, or with one pressing of the switch, the duration of the pressing being longer than a predetermined value, or in many other ways.

FIG. 3 shows a typical structure of the measuring-phase series, i.e. the measurement hierarchy, along which the microprocessor can be programmed to operate automatically. Here the Roman numerals I-III stand for information levels, the tabulated items stand for the data to be recorded, and the figure produced according to the decimal system stands for the ordinal code of the measurement (i.e. the number in 12 in FIG. 2). Several such measuring hierarchies can be programmed in advance into the microprocessor, primarily those which the person carrying out the measuring will need during a working day.

It is desirable to program the recording of pile. measurement data into one and the same implement, since one deal is measured at the same time, in which case the height and length data are recorded in centimeters, as is the length sampling. The user selects the phase series at each particular time by pushing the slide 8 past the actual measuring scale to a point indicating a change of program, i.e. a change of the phase series, and by pressing here the switch 11 selects the phase series (=program) he will use at each particular time. The shift of the phase series can, of course, also be effected in some other planned manner. In a manner corresponding to the above-mentioned termination and selection of a phase series, the user can correct previous values which have for some reason been found to be erroneous by shifting the slide to a point coded for the fact in question and, by pressing the switch 11, shift the program to the desired point in the phase chain, whereafter the correct new value is entered, and the user returns to the point where the phase series was interrupted, by following the planned procedures with respect to the slide 8 and the switch 11 as above, corresponding to those described above.

The data to be recorded, names of persons, sample areas, and other such factors can be recorded by using the alphanumeric scale of the implement, either one letter and numeral at a time or by using pre-coded scale points denoting wider entities.

When the measurings of the working day have been carried out, the person who has done them will drop in at, for example, the office, where he connects his recording unit by using an appropriate cable to the office computer, which reads, for the purpose of further processing, the data in the memory of the recording unit. This connection can, of course, also be effected using the telephone and a modem. At the same time the office computer can be used for programming the recording unit for the work of the following day, or this programming can be done in a corresponding manner at the beginning of a working day. No paper or separate recording equipment is needed during the entire work in the field or during the transfer or processing of the data. When necessary, computing routines, printer interfaces, etc., can be included in the programs, in which case the list of the measurements can be printed out for the forest owner on the spot. The microprocessor of the recording unit can also be made programmable in the field, but in general it is most practical to limit its programmability to those properties which are actually needed in the field and to leave any other functions to be transferred from a larger machine.

In the example described above, a graduated scale marked on the sliding caliper gage arm 7 was used for setting the slide, and the value or symbol corresponding to it could be checked in the display of the recording unit. The implement is made such that, when a certain recording can be being made, the graduated scale corresponding to this measurement value does not appear at all on the gage arm 7, but, when the slide 8 is drawn along the arm 7, only the value or symbol in the display 10 is followed, the slide is stopped when the desired/-known value or symbol shows in the display, this value being recorded by a pressing of the switch. This feature enables, for example, arbitrary programmed scales, suitable for the purpose at each particular time, to be used. However, it is usually most practical to keep the principal scales visible, marked mechanically on the arm 7, since finding them is in that case physically most effective.

The method according to the invention was applied above to a sliding caliper gage and with one sensor which detects the distance of the slide from the fixed jaw. In this case, it is easy to connect to the recording unit of the slide, for example, a length-measuring tool in the form of a tape measure which, when drawn out, turns, for example, its own potentiometer, the value of which is read by the microprocessor for recording when the switch 11 is pressed. Similarly, with the aid of separate potentiometers, several measuring devices used in timber measuring or elsewhere can be linked to the implement; the microprocessor reads and records their values. It is also possible to make constructions in which the different measuring devices utilize one common potentiometer to indicate the measurement value or a symbol.

Although a potentiometer has mostly been mentioned above in connection with the sensor, the sensor can, when the method of the invention is applied, be of any structure which yields an analog signal and may be based on several physical phenomena. The sensor structure can also from the very beginning be based on a suitable digital signal.

The invention is by no means limited only to measuring timber; it can be applied to all measuring and recording operations taking place on land and at sea.

I claim:

1. A method of recording data, comprising the steps of:
   providing a measuring instrument having a memory, a programmable recording unit coupled to the memory, a movable element, a sensor for detecting the position of the movable element, and a single activating means coupled to the recording unit;
   programming the recording unit so it selectively operates in first and second program portions responsive to actuation of the activating means to store values in the memory whereby the recording unit interprets the output of the sensor as a measurement value when operating in the first program portion and as an alphanumeric value when operating in the second program portion;
   actuating the activating means a first time when operating in one of the first and second program portions to cause the recording unit to store a first value in the memory; and
   actuating the activating means a second time when operating in the other of the first and second program portions to store a second value in the memory.

2. The method of claim 1, wherein the sensor is adapted to sense an alphanumeric scale and the programming step is performed using the movable element and the activating means.

3. The method of claim 1, comprising the further step of transferring the stored values in electronic form to a separate device for further processing.

4. The method of claim 1, wherein the programming step is performed by entering a program in electronic form from a separate computer.

5. The method of claim 1, comprising the further step of displaying information to a user about the nature of the value to be stored prior to such storage.

6. A measuring implement suitable for use in the field, comprising:
   an electronic memory unit;
   a movable element capable of being positioned at any of a plurality of positions;
   a sensor for sensing the position of the movable element;
   means for interpreting each position of the movable element as a distinct value on each of a plurality of different alphanumeric scales, at least one of said scales comprising alphabetic values;
   means for selecting a desired on of the plurality of different alphanumeric scales; and
   an activating means for causing a value corresponding to the position of the movable element to be recorded in to electronic memory unit by a single contact function.

7. The measuring implement of claim 6, wherein the implement further comprises a fixed member and one of said alphanumeric scales indicates the distance of the movable element from the fixed member.

8. The measuring implement of claim 7, wherein the implement further comprises a programmable microcomputer programmed to operate in a plurality of phase, the microcomputer selecting different alphanumeric scales in different phases of its operation.

9. The measuring implement of claim 8, wherein the microcomputer is programmed using the activating means.

10. The measuring implement of claim 7, wherein said implement further comprises means for displaying information to a user about the phase in which the microcomputer is operating.

11. A measuring implement suitable for use in the field, comprising:
    a fixed structural part;
    a movable structural part;
    a measuring and recording unit comprising a sensor for detecting the relative positioning of the fixed structural part and the movable structural part, a switch, and an electronic memory unit;
    a first alphanumeric scale stored in the memory unit correlating the relative positioning detected by the sensor with a first set of values;
    a second alphanumeric scale stored in the memory unit correlating the relative positioning detected by the sensor with a second set of values including alphabetic values;
    means for selecting one of said first and second alphanumeric scales; and
    means for recording a value correlated with the relative positioning detected by the sensor into said memory unit by a single actuation of a switch.

12. The measuring implement of claim 11, further comprising means for displaying to the user the value correlated with the relative positioning detected by the sensor.

13. The measuring implement of claim 11, wherein said measuring and recording unit comprises means for connecting and transferring electronic information between said implement and a separate device.

14. The measuring implement of claim 11, further comprising a plurality of movable structural parts and a plurality of interconnected sensors.

* * * * *